(12) United States Patent
Kum et al.

(10) Patent No.: US 9,191,705 B1
(45) Date of Patent: Nov. 17, 2015

(54) MANAGING MEDIA QUALITY

(71) Applicant: Google Inc., Mountain View, CA (US)

(72) Inventors: Sang-Uok Kum, Sunnyvale, CA (US);
Meng Wang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 13/875,155

(22) Filed: May 1, 2013

(51) Int. Cl.
*H04H 60/32* (2008.01)
*H04N 21/442* (2011.01)
*H04N 21/2743* (2011.01)

(52) U.S. Cl.
CPC ......... *H04N 21/442* (2013.01); *H04N 21/2743* (2013.01)

(58) Field of Classification Search
USPC ..................................... 725/14, 94
See application file for complete search history.

(56) References Cited

U.S. PATENT DOCUMENTS

2007/0074266 A1* 3/2007 Raveendran et al. .......... 725/135
2010/0023979 A1* 1/2010 Patel et al. ...................... 725/93
2010/0083303 A1* 4/2010 Redei et al. ..................... 725/32

* cited by examiner

*Primary Examiner* — Pankaj Kumar
*Assistant Examiner* — Charles N Hicks
(74) *Attorney, Agent, or Firm* — Fenwick & West LLP

(57) ABSTRACT

A system and method for managing media quality is provided. The system includes a data store with a computer readable medium storing a program of instructions for the managing of media quality; a processor that executes the program of instructions; a media analysis unit to receive transcoded media from a media store, and to detect for a phenomena affecting the transcoded media; a media quality manager, in response to the media analysis unit detection of the phenomena, determining a parameter for transcoding media; and a re-transcode unit to re-transcode the transcoded media based on the parameter.

8 Claims, 3 Drawing Sheets

MANAGING MEDIA QUALITY

BACKGROUND

A variety of online services may retrieve videos from a source, such as a video sharing web site or a service that delivers videos to an application on a user device. The online services may distribute the videos to users who access the online services. For example, blog web sites, social networking web sites, and the like, may host videos in order to augment the content that the web sites already provide.

The videos may be sourced from users of the video sharing web site, or from publishers of content. The videos may be produced and captured in a large variety of formats and conditions. The videos may be professionally produced via high definition technology, or alternatively, captured via a user's personal camcorder device. Thus, the quality of the video may differ from source to source.

The source of the video may upload the video in a raw data form. Often times, the raw data may contain various video attributes that may cause the video to be presented in a degraded manner.

Further, once the videos are uploaded, the videos may be transcoded. Transcoding is the process of converting a digital file into a digital file of a different format. The transcoding into various formats may be performed to ensure that the videos are in a format compatible with a variety of video player applications and user devices.

The uploaded video may contain interlacing. An interlaced video is designed to be captured, transmitted, or stored, and displayed in the same interlaced format. Because each frame of an interlaced video is composed of two fields that are captured at different moments in time, interlaced video frames will exhibit motion artifacts known as "interlacing effects", or "combing", if the recorded objects are moving fast enough to be in different positions when each individual field is captured, These artifacts may be more visible when the interlaced video is displayed at a slower speed than it was captured or when still frames are presented.

Interlaced videos introduce a phenomena called interline twitter. The interline twitter may show up when the subject being shot contains vertical detail that approaches the horizontal resolution of the video format. For instance, a person on television wearing a shirt with fine dark and light stripes may appear on a video monitor as if the stripes on the shirt are "twittering".

Interlacing effects described above may cause the digital reproduction of videos to become frustrated. For example, if a user uploads a video to the video storing web site, and the video is subsequently accessed by another user, if the combing artifacts exist in the video, the other user may not be able to clearly watch the video, or the other user's experience may be lessened due to the distraction caused by the interlaced artifacts.

In addition to the interlace issues discussed above, several other phenomena may occur or be included in the uploaded video, such as video blocking. Video blocking is caused by the uploaded videos having blocked borders around an active portion of the video. If a video is uploaded with video blocking, and then subsequently viewed, the blocking may prevent the video from being displayed at a maximum size. This may occur because significant resources on a video player may be devoted to reproducing the blocked borders.

A video sharing web site may host numerous videos. For example, as the video sharing web site becomes more popular, the number of videos uploaded to the video sharing web site may reach the millions, if not more.

Further, the video sharing web site as discussed above may be relied upon to transcode the videos into numerous formats. This may be performed because the video sharing web site's videos may be shared through various services. A blogging web site may display a high quality, data intensive version of the video. Conversely, the social networking web site may display a low quality, compressed version of the video.

Additionally, the video sharing web site, and the videos sourced from the video sharing web site, may be accessed by a variety of user devices, such as a personal computer, tablet, or smart phone. Thus, the videos sourced from the video sharing web site may be displayed and transcoded in various formats based on the user device employed to access the videos.

SUMMARY

A system for managing media quality includes a data store with a computer readable medium storing a program of instructions for the managing of media quality; a processor that executes the program of instructions, a media analysis unit to receive transcoded media from a media store, and to detect for a phenomena affecting the transcoded media: a media quality manager, in response to the media analysis unit detection of the phenomena, determining a parameter for transcoding media; and a re-transcode unit to re-transcode the transcoded media based on the parameter.

DESCRIPTION OF THE DRAWINGS

The detailed description refers to the following drawings, in which like numerals refer to like items, and in which.

DETAILED DESCRIPTION

The video sharing web site that sources videos to numerous other services, such as a social networking web site, a blogging web site, and the like, may receive numerous videos via user's and other sources uploading content. The quality of the uploaded videos may be questionable, as the user's and other sources may introduce affects associated with the video to compromise the quality of the videos.

For example, certain videos uploaded to the Internet web site may include combing and blocking, and be served to users with these phenomena still included in the videos. Thus, the quality of video presentation becomes lessened, thereby potentially discouraging video viewers from returning to the Internet web site.

Due to the numerous amounts of videos uploaded, the video sharing web site may incorporate a media organizer that handles the transcoding and detection of videos. However, the task of manually checking the videos for errors may become cumbersome, especially when the videos uploaded to the video sharing web site become large in number.

Disclosed herein are methods and systems for managing media quality for a video sharing web site, or any video corpus configured to receive videos from external sources. Through employing the methods and systems disclosed herein, a large number of videos may be transcoded, identified as containing a defect (such as interlacing or blocking), and re-transcoded. Because the methods and systems disclosed herein employ a centralized media organizer, the re-transcoding parameters may be stored, and recalled for subsequent transcode operations of the original video.

Figure 1:
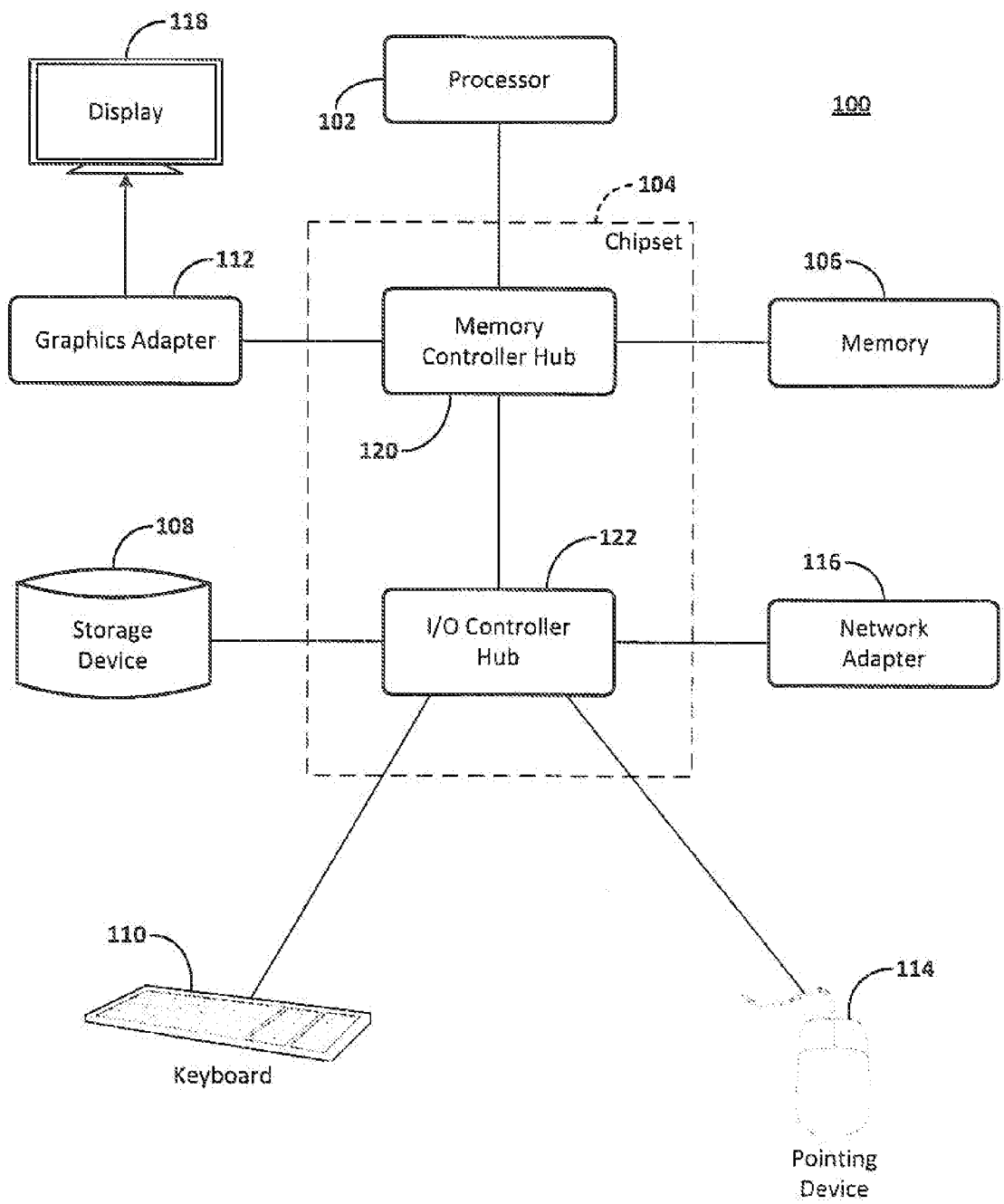
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device; tablet, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
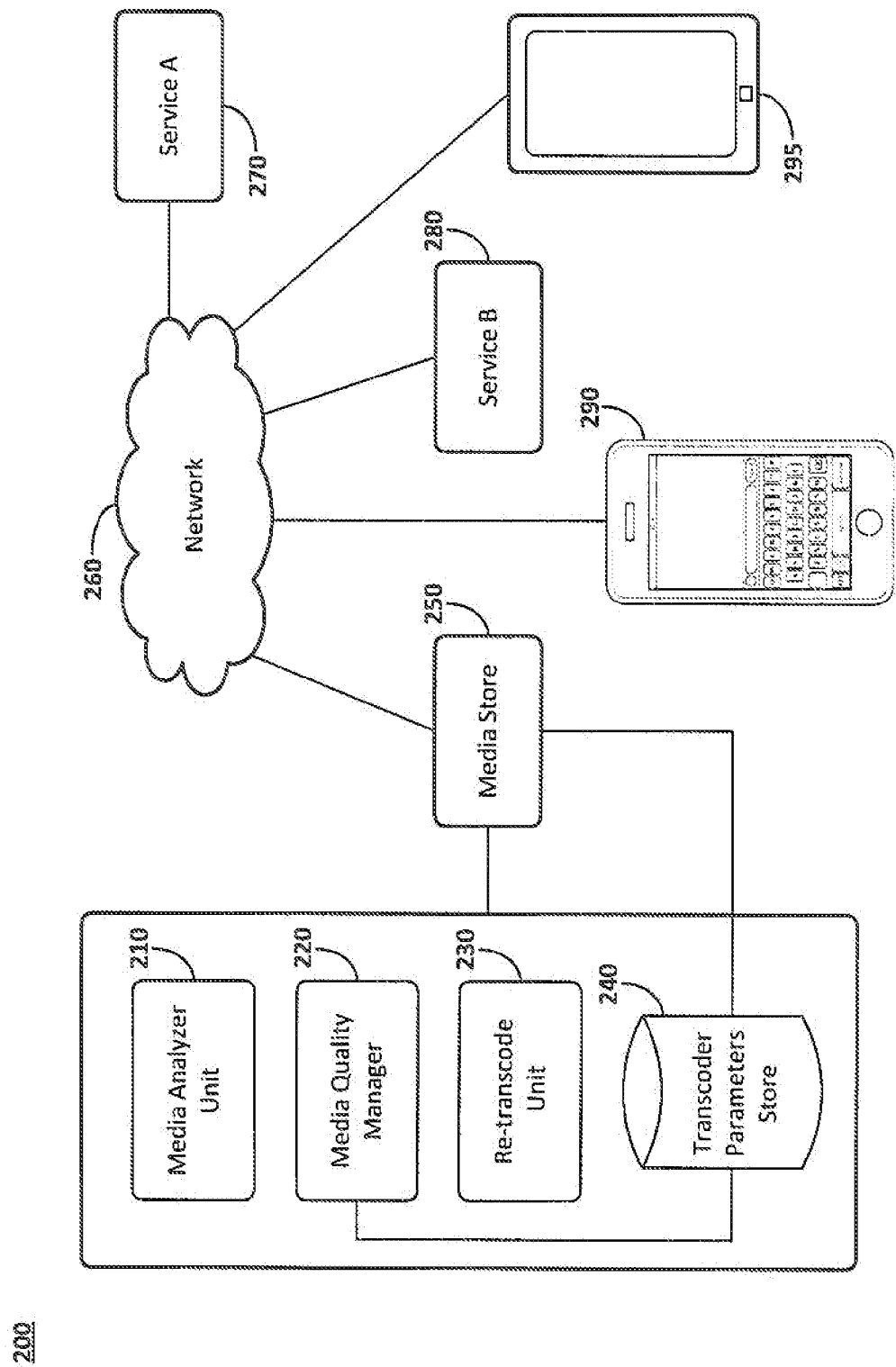
FIG. 2 illustrates an example of a system for managing media quality.

FIG. 2 illustrates an example of a system 200 for managing media quality. The system 200 includes a media analyzer unit 210, a media quality manager 220, a re-transcoder unit 230, and a transcoder parameter store 240. The system 200 may be implemented on a distributed storage device, such as a cloud, or on a device such as computer 100.

The system 200 interacts with a media store 250. The media store 250 may serve as a gateway to receive, transcode, and distribute the various media items, including video and audio, to a plurality of services, such as service A 270 and service B 280. The media store 250 may interact with service A 270 and service B 280 via network 260. The media store 250 may be equipped with a processor capable of queuing uploaded videos, and subsequently transcoding the videos into a format delivered to each respective service.

The services, service A 270 and service B 250 may be services directed to serving content to a variety of user devices, such as user device 290 and user device 295. The services may be a blog, a social networking service, or a video sharing service, for example. The user devices may be any device, such as computer 100, directed to accessing content via the services shown connected to network 260. The device may be a personal computer, a smart phone, a tablet, or a smart television, for example.

The media analyzer unit 210 reviews transcoded videos from the media store 250. In response to videos being uploaded, the videos may be transcoded into a unifying format. The media analyzer unit 210 may perform a detection to determine if the video being reviewed is affected by various phenomena, such as interlacing or blocking. Thus, the media analyzer unit 210 may denote that the video being analyzed is to be re-queued for further quality determinations and processing to address the detected phenomena.

The media quality manager 220, in response to the media analyzer unit 210 denoting that a video is to be re-queued, performs a further determination based on parameters that may be employed to re-transcode the video. The parameters may be selected based on the detected phenomena analyzed by the media analyzer unit 210.

For example, if the original video is detected to contain affects caused by interlacing, a parameter may be selected via the transcode process that ensures that the re-transcoded video will contain lesser or no effects caused by interlacing. In another example, if the media analyzer unit 210 detects that the video contains blocking, the parameters selected for the re-transcoding may address the blocking.

The parameters may be stored in a transcoder parameter store 240. The parameters may be subsequently accessed by the media store 250 in response to the video being requested to be transcoded into a new format or for a newly supported device.

The re-transcode unit 230 may perform a re-transcoding of the video analyzed by the media analysis unit 210. The re-transcode unit 230 may perform the re-transcode based on an indication from the media quality manager 230 that updated parameters for transcoding are generated. Thus, re-transcode unit 230 may perform the re-transcoding based on the updated parameters stored in the transcoder parameter store 240.

The re-transcode unit 230 may perform a re-transcoding in response to a detection of a new format based on an introduction of a new device or service. For example, if service B 280 or user device 295 is introduced after a video has been transcoded/re-transcoded, and service B 280 or user device 295 employ a digital format not compatible with any of the existing formats of the video, the re-transcode unit 230 may perform a re-transcode on the video employing the parameters stored in the transcoder parameter store 240 for the digital format compatible for service B 280 or user device 295.

In order to ensure that the re-transcoding is not performed on a changed version of the video, the re-transcode unit 230 may be configured to be performed on the original version of the video (i.e. the uploaded version). Thus, even as a video gets changed through user or system edits, any subsequent version or re-transcoding will be performed on the original uploaded video.

Figure 3:
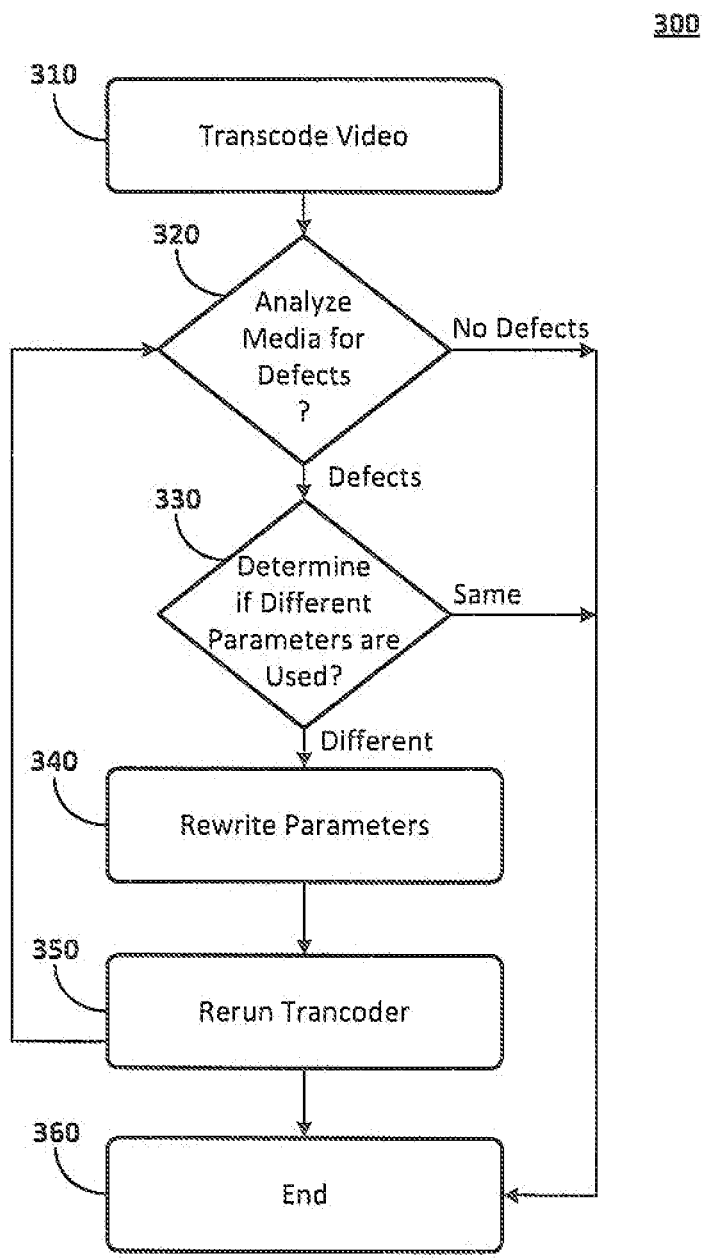
FIG. 3 illustrates an example of a method for managing media quality.

FIG. 3 illustrates an example of a method 300 for managing media quality. The method 300 may be implemented on a system or a device, such as system 200 described above.

In operation 310, an uploaded video is transcoded into a unifying format. The uploaded video may be sourced from various user devices or services. Thus, the uploaded video may be stored in a variety of formats. By transcoding the uploaded video into a unifying format, a media sharing source may distribute the uploaded video via a common player. The video may be transcoded into a variety of formats, thereby ensuring that the media sharing source has the ability to provide the video in a format compatible with a number of services for serving the video.

In operation 320, a determination is made if the video uploaded in operation 310 contains any defects. For example, a determination may be made to ascertain whether the video exhibits any sort of phenomena, such as interlacing or blocking. If the determination is affirmative, method 300 may proceed to operation 330. Alternatively, method 300 may terminate (operation 360).

In operation 330, a determination is made as to whether the phenomena associated with the uploaded video are addressable via parameters employed for transcoding. If so, the parameters employed for transcoding the uploaded video are rewritten (in operation 340), and stored in a persistent stare.

In operation 350, the video is re-transcoded using the updated parameters (from operation 340). Thus, the video may be re-transcoded with parameters that address the phenomena detected in operation 320.

After operation 350, the method 300 may proceed to the end (operation 360). Alternatively, the method 300 may proceed to operation 320 and preform the operations 320-350 iteratively. The implementer of method 300 may place a limit on the number of times operations 320-350 are iteratively performed.

In addition to being employed during an initial transcoding (and a re-transcoding), the parameters that are stored in operation 340 may be employed in response to transcoding being requested for the uploaded video. As explained above in regards to system 200, a video may be re-transcoded in response to demands for updated or newer formats supported by various embedded players or devices.

By employing the methods and systems disclosed herein, the quality of media, such as videos, is automatically verified and improved upon based on the queuing disclosed above. Further, because the parameters are stored for each original video, the re-transcoding of the only video may be done in an efficient manner.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system for managing media quality, comprising:
   a data store comprising a non-transitory computer readable medium storing a program of executable instructions for the managing of media quality;
   a processor that executes the program of instructions to:
   store an original media in a persistent media store, wherein the original media is a video uploaded to the media store;
   transcode the original media using a first set of transcoding parameters to produce transcoded media in the media store;
   analyze the transcoded media in the media store to determine whether one or more phenomena affect the transcoded media, the one or more phenomena lessening a quality of the transcoded media;
   responsive to detection of the one or more phenomena affecting the transcoded media:
   determine a second set of transcoding parameters that address the detected one or more phenomena when used for transcoding, the second set of transcoding parameters being different than the first set of transcoding parameters;
   store the second set of transcoding parameters in a persistent transcoder parameter store; and
   responsive to introduction of a service or device employing a digital format incompatible with the transcoded media, re-transcode the original media using the second set of transcoding parameters to produce a second transcoded media in a digital format compatible with the service or device.

2. The system according to claim 1, wherein the one or more phenomena comprise interlacing.

3. The system according to claim 1, wherein the one or more phenomena comprise video blocking.

4. The system according to claim 1, wherein the original media is one of a queue of the plurality of videos.

5. A method for managing media quality, comprising:
   storing an original media in a persistent media store, wherein the original media is a video uploaded to the media store;
   transcoding the original media using a first set of transcoding parameters to produce transcoded media in the media store;
   analyzing the transcoded media in the media store to determine whether one or more phenomena affect the transcoded media, the one or more phenomena lessening a quality of the transcoded media;
   responsive to detection of the one or more phenomena affecting the transcoded media:
   determining a second set of transcoding parameters that address the detected one or more phenomena when used for transcoding, the second set of transcoding parameters being different than the first set of transcoding parameters;
   storing the second set of transcoding parameters in a persistent transcoder parameter store; and
   responsive to introduction of a service or device employing a digital format incompatible with the transcoded media, re-transcoding, via a processor, the original media using the second set of transcoding parameters to produce a second transcoded media in a digital format compatible with the service or device.

6. The method according to claim 5, wherein the one or more phenomena comprise interlacing.

7. The method according to claim 5, wherein the one or more phenomena comprise video blocking.

8. The method according to claim 5, wherein the original media is one of a queue of the plurality of videos.

* * * * *